United States Patent [19]

Holub

[11] Patent Number: 5,040,751
[45] Date of Patent: Aug. 20, 1991

[54] ADJUSTABLE PIPE HANGER

[76] Inventor: Sidney L. Holub, 1878 Denkinger Rd., Concord, Calif. 94521

[21] Appl. No.: 124,425

[22] Filed: Nov. 13, 1987

Related U.S. Application Data

[63] Continuation of Ser. No. 815,237, Dec. 31, 1985, abandoned.

[51] Int. Cl.⁵ .................................. F16L 3/00
[52] U.S. Cl. ................................... 248/62; 248/74.1; 248/74.3
[58] Field of Search .......... 248/67, 74.1, 74.3, 248/231, 219.4, 62, ; 24/16 R, 16 PB

[56] References Cited

U.S. PATENT DOCUMENTS

| | | | |
|---|---|---|---|
| 670,870 | 3/1901 | Drozeski | 248/62 |
| 840,337 | 1/1907 | Johnson | 248/62 X |
| 1,262,276 | 3/1918 | Farley | |
| 1,515,216 | 11/1924 | Kissinger | 248/60 |
| 1,542,548 | 6/1975 | Gordon | 248/231 |
| 1,698,571 | 10/1922 | Van Cleve | |
| 2,158,802 | 5/1939 | Redlon | 248/62 |
| 2,354,404 | 7/1944 | Sayles | |
| 3,273,837 | 9/1966 | Willert et al. | |
| 3,402,908 | 9/1968 | Gill | 248/231 |
| 3,917,205 | 11/1975 | Meadors | 248/231 |
| 3,966,154 | 6/1976 | Perroult | 248/74.3 |
| 4,121,880 | 10/1978 | Pollins | 248/74.3 |
| 4,135,272 | 1/1979 | Stephenson | 24/16 PBX |
| 4,182,005 | 1/1980 | Harrington | 24/16 PB |
| 4,282,730 | 8/1981 | Lipschutz | 248/231 |
| 4,309,263 | 1/1982 | Boyd | 248/231 |
| 4,348,000 | 9/1987 | Hanner | 248/231 |
| 4,379,537 | 4/1983 | Perroult | 248/74.3 |
| 4,397,436 | 8/1983 | Lyon | 248/74.3 |
| 4,498,507 | 2/1985 | Thompson | 24/16 PBX |
| 4,678,147 | 7/1987 | Barnes et al. | 248/231 Y |
| 8,503,337 | 1/1907 | Johnson | |

FOREIGN PATENT DOCUMENTS

| | | | |
|---|---|---|---|
| 695251 | 9/1964 | Canada | 248/74.3 |
| 899968 | 12/1953 | Fed. Rep. of Germany | 248/74.3 |
| 2217312 | 4/1972 | Fed. Rep. of Germany | 248/74.3 |
| 581288 | 10/1976 | Switzerland | 248/74.3 |
| 1600605 | 10/1981 | United Kingdom | 248/74.3 |

Primary Examiner—Alvin C. Chin-Shue
Attorney, Agent, or Firm—Donald L. Beeson

[57] ABSTRACT

An adjustable pipe hanger includes a hanger rod to the bottom of which there is attached a unitary pipe stabilizing element having an arcuate pipe capping surface. A detached flexible strap having a series of holes along its length is threaded through strap guide channels which are formed on opposite sides of the pipe stabilizing element. The position of the strap holes are selected so that, when the strap is wrapped around any one of a number of standard size pipes or pipe fittings braced against the stabilizing element's arcuate pipe capping surface, the strap can be secured to a strap retaining pin on the stabilizing element. The strap is provided with an enlarged base end so that it will not pass through, but will be captured by, the first pipe guide channel through which it is threaded. The strap holes are provided with relief slots so that the strap will not hold the pipe too tightly and will permit axial movement of the pipe through the hanger.

9 Claims, 2 Drawing Sheets

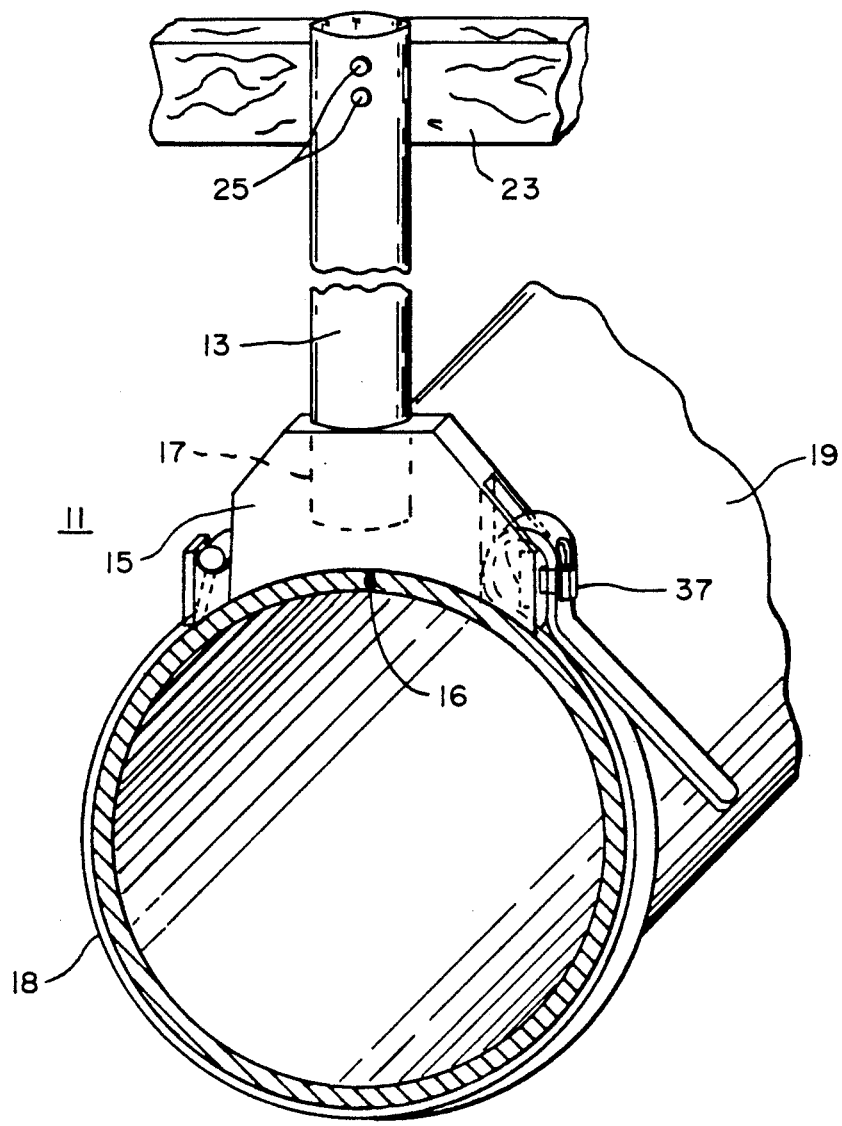
FIG.—1
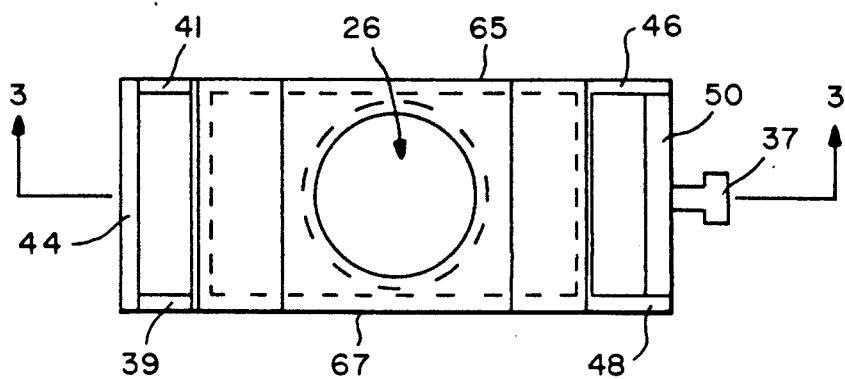
FIG.—2

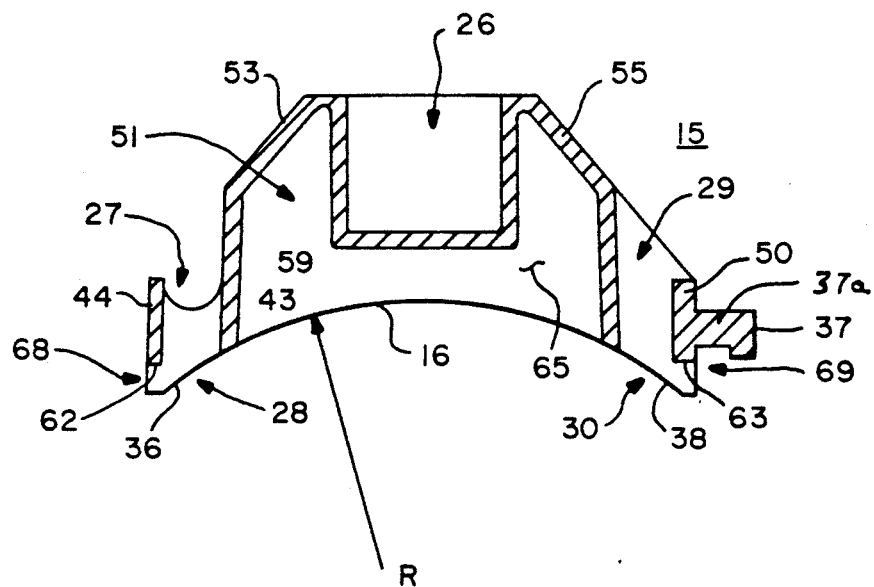
FIG.—3
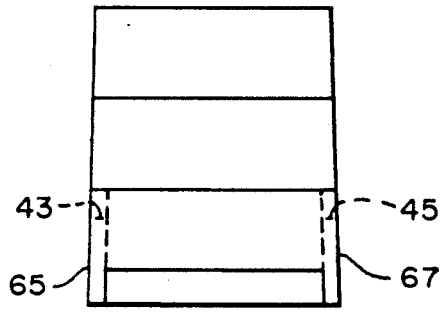
FIG.—5
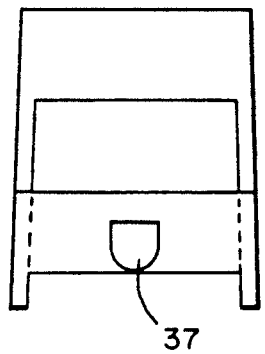
FIG.—4
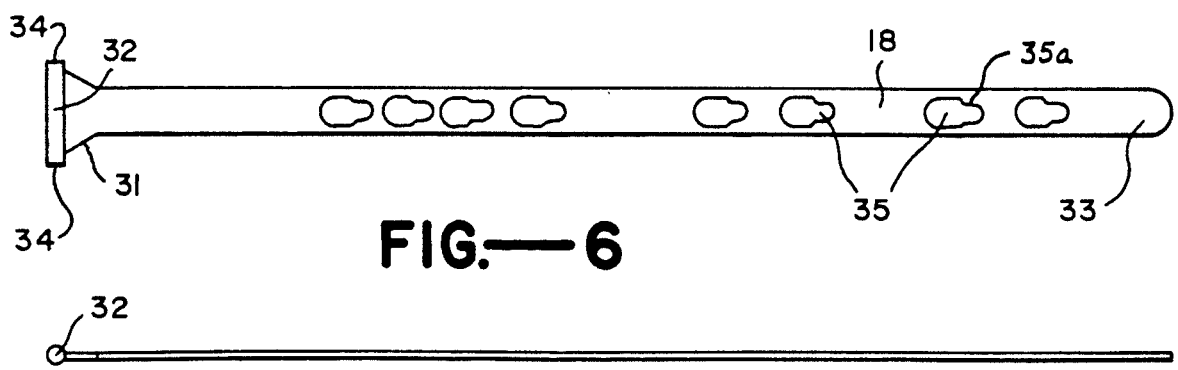
FIG.—6
FIG.—7

ADJUSTABLE PIPE HANGER

CROSS-REFERENCE TO RELATED APPLICATIONS

This is a continuation of application Ser. No. 06/815,237, filed Dec. 31, 1985, now abandoned.

BACKGROUND OF THE INVENTION

The present invention generally relates to devices for hanging pipes and in particular for securing a run of plastic drain pipe, typically abs or pvc pipe, beneath structural elements of a building at a fixed grade for proper drainage.

When a building is constructed drain pipes must normally be plumbed from various locations within the building to an external drain line. The sections of pipe, typically ranging from 1½" to 4" in diameter, are joined together by various types of fittings to create an extended run of pipe, the horizontal portions of which must be suspended from structural elements of the building, such as the floor joists. Also, to maintain proper drainage it is important that the pipe, throughout its run, have a suitable grade and that the pipe not be allowed to shift to a position that would eliminate the grade over any part of the pipes length. Also of concern is lateral shifting. The pipe needs to be held in a fixed position, yet loosely enough to accommodate natural expansion and contraction of the pipe.

Cast iron pipe, one time in widespread use, was typically suspended by means of "plumbers tape", a flexible metal strip which cradles the pipe and is nailed to overhead structural elements through pre-drilled holes in the tape. Because plastic pipe has substantially replaced the use of cast iron pipe, more rigid hanger devices have been devised to prevent the lighter and more flexible plastic pipe from "floating" as the pipe is subjected to the external or internal temperature changes. One such device is illustrated in U.S. Pat. No. 3,273,837, issued Sept. 20, 1966, to C. C. Wallert, et al., which discloses a pipe hanger that rigidly holds the plastic drain pipe in a fixed position. The Willert patent also discusses an additional general requirement for supporting plastic pipe, that of requiring more closely spaced support elements to avoid sagging.

However, the disadvantage with existing pipe hangers, such as disclosed in the Wallert patent, is that each pipe hanger is designed for a specific pipe diameter requiring a different size device for each change in pipe size. Moreover, it often occurs that a pipe needs to be held at a position where a pipe fitting is found. At such a position plastic pipe hangers produced for standard sized pipe diameters cannot be used.

The present invention provides an adjustable pipe hanger which, in one device, will accommodate most standard sized plastic pipes and which will securely hold a relatively small or relatively large pipe in a fixed vertical elevation as well as against undesirable lateral movement, while accommodating normally experienced pipe expansion and contraction. The pipe hanger of the invention can be designed to fit standard size pipe fittings in addition to standard size pipes, and can be installed easily and quickly. Moreover, the design of the invention is such that it adapts itself to inexpensive fabrication techniques, such as injection molding, and therefore can be made in large quatities relatively inexpensively.

SUMMARY OF THE INVENTION

In accordance with the invention, an adjustable pipe hanger is comprised of a hanger rod, to the bottom end of which is attached a pipe position stabilizing element having an arcuate pipe capping surface against which different diameter pipes can be held as hereinafter described. A detached flexible pipe strap is provided having an enlarged base end and a tail end. The pipe stabilizing element is in turn provided with first and second pipe strap guide channels which have bottom channel openings adjacent the engaging surface of the pipe stabilizing element. The first strap guide channel is formed to capture and hold the enlarged end of the pipe strap when the pipe strap is threaded through the channel and the second guide channel is formed to threadably receive the opposite tail end of the strap. Means are provided at the second guide channel for securing the strap's tail end when a pipe is strapped upwardly against the engaging surface of the pipe stabilizing element. Such securement means, in the preferred embodiment, comprises a strap locking pin projecting from the outer wall surface of the second channel where it can engage one of a plurality of holes that are prepositioned on the strap so that the strap lengths to each of the holes correspond to both standard pipe sizes as well as standard fittings sizes. It is also contemplated that the means for securing the pipe strap will cause the secured pipe to be held tightly enough for the stabilizing element's arcuate pipe capping surface to cap the pipe, but lossely enough to permit axial slippage of the pipe in the pipe strap. This will permit the pipe hanger of the invention to accommodate normal expansion and contraction of the secured pipe.

Further in accordance with the invention, the capping surface of the pipe stabilizing element is provided with the radius of curvature of a size to accommodate a relatively large diameter pipe corresponding to the largest diameter pipe for which the invention is intended to be used. At the same time, the arc over which the radius of curvature of this capping surface extends is chosen to be relatively small so as to permit the pipe strap to securely hold relatively small diameter pipes against this same capping surface. It is contemplated that the pipe hanger of the invention will be designed to hold pipes ranging in diameter from 1½" to 4", though it will be readily understood that the invention could be made to accommodate pipe sizes outside of this range.

In its preferred construction, the two pipe strap guide channels of the invention's pipe stabilizing element will be constructed such that their bottom opening will permit the pipe strap to thread through the bottom of the channel without being pinched by the pipe being held by the strap. With such a construction, the pipe strap can easily be pulled tautly around the pipe for securement of the tail end of the pipe strap without the pipe binding, and even possibly severing, the strap.

Using the pipe hanger of the invention, any one of several standard pipe sizes or fitting sizes can be secured by simply threading a detached pipe strap through the pipe stabilizing element of the invention and around the pipe, and then mechanically securing the tail end of the pipe strap. The hanger rod is attached at its free end to an overhead structural element, such as a floor joist, by nailing the top of the hanger rod to the structural element after the pipe hanger is rotated to its desired rotational orientation. An alternative means of attaching the hanger rod might be to provide pre-drilled holes in the top of the rod for accommodating wood screws.

Therefore, it can be seen that a principle object of the present invention is to provide an inexpensively fabricated and easy to use pipe hanger device which can be readily adjusted to accommodate different standard size pipes, as well as different standard pipe fittings. It is a further object of the invention to provide an adjustable pipe hanger which will securely hold a length of plastic pipe in a vertical elevation so as to maintain the grade of the pipe, to restrain lateral movement of the pipe, and at the same time to give the pipe the ability to slide within the hanger to accommodate normal expansions and contractions which occur in diverse temperature conditions. Other objects of the invention will become apparent from the following description of the preferred embodiment of the invention, which embodiment is illustrated in the below described drawings.

DESCRIPTION OF THE DRAWINGS

FIG. 1 is an isometric view of an adjustable pipe hanger made in accordance with my invention showing the pipe hanger secured to a section of relatively large diameter pipe.

FIG. 2 is a top plan view of the pipe stabilizing element of the pipe hanger illustrated in FIG. 1.

FIG. 3 is a cross-sectional view in front elevation of the pipe stabilizing element shown in FIG. 2 taken along sectional lines 3—3.

FIG. 4 is a right side elevational view of the pipe stabilizing element shown in FIG. 2.

FIG. 5 is a left side elevational of the pipe stabilizing element shown in FIG. 2.

FIG. 6 is a top plan view of a pipe strap of the pipe hanger shown in FIG. 1.

FIG. 7 is a side elevational view of the pipe strap of FIG. 6.

DETAILED DESCRIPTION OF THE ILLUSTRATED EMBODIMENT

FIG. 1 illustrates a pipe hanger, generally designated by the numeral 11, comprised of a hanger rod 13, pipe stabilizing element 15 secured to the bottom end 17 of the hanger rod, and a pipe strap 18, which threads through opposite ends of the pipe stabilizing element as hereinafter described to secure a length of pipe 19. The top end 21 of the hanger rod is in turn attached to an overhead structural element, such as a floor joist 23, by suitable attachment means such as by nailing the end of the hanger rod to the structural element as seen by nails 25.

The hanger rod 13 can be made from a cut section of ½" abs or pvc pipe, with the pipe's bottom end 17 being glued into the cavity 26 formed at the top side of the pipe stabilizing element 15. The pipe stabilizing element is likewise preferably fabricated of a plastic material and can be fabricated to be a very light weight unitary element which can be mass produced, such as by means of an injection molding process. In addition to the manufacturing cost advantages of providing a plastic pipe stabilizing element made of plastic, the relative resiliency of the plastic surfaces of that element will keep the element from scoring the plastic pipe which it holds. A pipe stabilizing element fabricated of metal would tend to score and thereby weaken the secured plastic pipe.

Referring to FIGS. 3–6, the pipe hanger's pipe stabilizing element 15 includes a pipe capping surface 16 opposite the hanger rod 13, and first and second pipe strap guide channels 27, 29 located at opposite sides of the stabilizing element and through which the end detached pipe strap 17 can be threaded. The pipe capping surface is arcuate in shape and follows a radius of curvature, designated "R", selected to conform to the largest diameter pipe to be held by the hanger 11. On a typical construction job, the largest pipe with which the hanger would most likely be used would be 4" pipe. Pipe called out as 4"; pipe will generally have a 4" inside diameter and an approximately ⅜ wall thickness. Accordingly, a suitable radius R for the pipe capping surface 16 would be 2⅜". On the other hand, the total length or arc of the pipe capping surface is made to be relatively small to permit the hanger to be used with substantially smaller pipe sizes. If the arc of the capping surface 16 were a full 180° with an approximately 2½" radius of curvature, the hanger could not firmly strap in place a small 1½" or 2" diameter pipe. Generally, a capping surface with an arc of about 60° to 90° would be suitable for achieving the objects of invention.

As best seen in FIG. 3, the pipe strap guide channels 27, 29 have bottom openings 28, 30 which are laterally positioned on opposite sides of the capping surface 16 of the pipe stabilizing element, with the curved bottom side edges 36, 38 of these openings forming an extension of the capping surface. As further described below, the first and second guide channels 27, 29 are formed such that the pipe strap 13 can be pulled through both channels without being pinched between the pipe 19 when the pipe, during an installation, is braced up against the capping surface.

FIGS. 6 and 7 illustrate the pipe strap 18 which is an elongated piece of flexible material, such as pvc plastic, having an enlarged base end 31, including a laterally extending cross-rib 32, and a tail end 33. It is suggested that the strap be approximately 18 inches long. Means for adjustably securing the strap around different sized pipes or fittings includes a series of strap holes 35 along the length of the strap. Each of the holes 35 will be positioned such that, when any one of a number of standard sized pipes or fittings are braced against the pipe capping surface 16 and the strap wrapped around it, one of the pipe strap holes will align with the strap retaining pin 37 projecting from the pipe stabilizing element behind the second 13 strap guide channel 29. Each of the strap holes 35 are further seen to have a relatively narrow relief slot 35a extending toward the tail end of the strap. Once the retaining pin 37 is engaged through the enlarged portion of a strap hole, the strap can be pulled down a slight distance to engage the relief slot over the neck 37a of the retaining pin thereby lockingly securing the strap on the pin and thereby also creating a slight gap between the pipe 19 and the capping surface 16 of the pipe stabilizing element to provide a loose enough fit to permit axial slippage of the pipe in the pipe strap. The arcuate capping surface 16 will prevent any substantial lateral movement of the pipe.

In order to capture and hold the enlarged base end 31 of the pipe strap 17, the first pipe guide channel 27 of the pipe stabilizing element 15 is formed with two spaced part side walls 39, 41 having curved upper cradling surfaces 43, 45 which cradle the extended ends 34 of the cross-rib 32 on the base end of the strap. The pipe strap is sized such that it will freely pass through the first guide channel 27 until the cross-rib of the enlarged end of the strap firmly seats against the side wall cradle surfaces of that channel. Because the pipe strap is a separate piece which is not mechanically attached to the hanger device, it can readily be discarded after use and replaced by a new strap. In this regard it is noted that any extra length to the tail 33 of the pipe strap can be cut off and put to other uses such as strapping a length of vertical pipe to a wall stud.

As best shown in FIG. 3, the pipe stabilizing element can be fabricated as a shell having finite wall thicknesses as opposed to being a solid piece. As shown in FIG. 3, the body 51 of the stabilizing element is formed by slanting top walls 53, 55 extending outwardly from the center cylindrical cavity 26 formed by the interior cavity walls 57. The body of the stabilizing element additionally includes vertical end walls 59, 61 that also form the interior walls of the first and second strap guide channels 27, 29, and side walls 65, 67, the bottom edges of which form the pipe capping surface 16. The first and second pipe strap guide channels are in turn formed as an extension of the main body 51 of the stabilizing element, with the first channel being formed by end wall 59, side walls 39, 41, and the outer vertical guidewall 44, and with the second strap guide channel being formed by end wall 61, side walls 46, 48 and outer vertical guidewall 50, on the outside surface of which is formed the pipe strap retaining pin 37. The retaining pin 37 and the guideway of the second strap guide channel 29 provide a means for releasably securing the tail end 33 of the pipe strap as herein described.

It is also seen that the interior end walls 59, 61 of the respective pipe strap guide channels are angled slightly inwardly toward the top of the stabilizing element. Angling this surface can facilitate threading of the pipe strap through the channels and around larger diameter pipes.

Additionally, it is seen that the pipe strap 18 which encircles a relatively large diameter pipe 19, such as shown in FIG. 1, will extend outwardly from and bear against the bottom edge 62, 63 of the guide channels outer guidewalls 44, 50. To prevent the strap from being pinched between the outer surface of the pipe 19 and these guidewall bottom edges, the outer guidewalls are recessed relative to the radius of curvature "R" of the pipe bearing surface 16 to provide a gap 68, 69 between this radius and the guidewalls. So constructed, the stabilizing element will permit the pipe strap to freely pass through the guide channels and to tightly encircle the pipe without the strap being bound up between the pipe and the stabilizing element.

To use the pipe hanger of the invention, a worker simply places the stabilizing element 15 over the top of a length of pipe or pipe fitting to be held, being sure to properly locate the pipe for a desired verticle drop or grade. The hanger is also positioned along the pipe's length so that the top end 21 of the upwardly extending hanger rod 13 touches an overhead structural member, e.g. a floor joist. If the hanger rod is too long for the space available, it can easily be cut to a suitable length; if it is too short an extension can easily be made by attaching an additional section of plastic pipe using a standard coupler. Once the hanger is positioned, the top end thereof is nailed or otherwise attached to the structural member. The pipe strap 18 is then inserted tail end first through the first pipe strap guide channel 27 of the stabilizing element 15. The strap is pulled through this channel until its enlarged base end is securely captured in this first channel. The pipe is then manually braced up against the pipe capping surface 16 and the tail end of the strap is pulled tightly through the second pipe strap guide channel 29. The tail end of the strap is then secured by pulling it down over the top of the outer guidewall 50 of the second channel 29 and by securing the appropriate one of the prepositioned pipe strap holes 35 over the external retaining pin 37. Finally, the strap cradling the pipe is forced down slightly so that the neck 37a engages in the strap hole relief slot. This secures the strap tail end and suitably loosens the tension in the strap to permit the pipe to slide axially in the hanger.

It can therefore be seen that the present invention is a new and novel adjustable pipe hanger which can be inexpensively fabricated, which is readily installed at a construction site and which is not limited to single pipe sizes. Although the invention has been described in considerable detail in the foregoing specification, it is not intended that the invention be limited to such detail, except as necessitated by the following claims.

What I claim is:

1. A pipe hanger comprising
    a hanger rod,
    a flexible and threadable unitary pipe strap, said pipe strap having an enlarged base end and a tail end,
    a pipe stabilizing element having a top side secured to the bottom end of said hanger rod,
    said pipe stabilizing element having an arcuate pipe capping surface on the bottom thereof opposite said hanger rod and further having first and second pipe strap guide channels extending from the top side of said pipe stabilizing element downwardly therethrough to provide pipe strap guide channel bottom openings on laterally opposite sides of said pipe capping surface, said pipe strap guide channels providing a sufficient enclosure for said pipe strap to prevent lateral dislodgement thereof from said pipe stabilizing element,
    said first pipe strap guide channel being formed to permit said pipe strap to be threaded therethrough from the top side of said pipe stabilizing element to said pipe capping surface, and having upper cradling surfaces for cradling the enlarged base end of said pipe strap in said first guide channel so as to removably hold same, and said second pipe strap guide channel being formed to permit the tail end of said pipe strap to be threaded therethrough when said pipe strap is wrapped around a pipe braced upwardly against the pipe capping surface of said pipe stabilizing element, and
    means for adjustably securing the tail end of said pipe strap whereby said pipe strap tail end can be pulled through said second pipe strap channel and secured to wrap pipes or pipe fittings of different diameters.

2. The pipe hanger of claim 1 wherein the arcuate pipe capping surface of said pipe stabilizing element is formed with a relatively large radius of curvature to accommodate relatively large pipe sizes but wherein the arc of said radius of curvature is relatively small to accommodate relatively small pipe sizes.

3. The pipe hanger of claim 1 wherein the first and second pipe strap guide channels of said pipe stabilizing element are further formed such that, when said pipe strap tail end is pulled around a pipe braced against the pipe capping surface of said stabilizing element and through said second channel, said pipe strap freely extends from the bottom opening of each of said first and second pipe guide channels without being pinched between said pipe and said stabilizing element.

4. The pipe hanger of claim 3 wherein said pipe capping surface of said pipe stabilizing element is defined by a radius of curvature and wherein each of said first and second pipe strap guide channels includes an outer guidewall having a bottom edge recessed in relation to the radius of curvature of said pipe capping surface whereby, when a relatively large pipe is braced thereagainst, said pipe strap will freely pass over said recessed bottom edge of said outer guidewall between said recessed edge and said pipe.

5. The pipe hanger of claim 1 wherein said capping surface of said pipe stabilizing element is fabricated of a resilient material.

6. A pipe hanger comprising
    a hanger rod,
    a flexible and threadable pipe strap, said pipe strap having an enlarged base end and a tail end,
    a unitary, plastic pipe stabilizing element having a top side secured to the bottom end of said hanger rod, said pipe stabilizing element having an arcuate pipe capping surface with a defined radius of curvature on the bottom thereof opposite said hanger rod and and further having first and second pipe strap guide channels extending from the top end of said pipe stabilizing element downwardly therethrough to provide pipe strap guide channel bottom openings on laterally opposite sides of said pipe capping surface, said pipe strap guide channels providing a sufficient enclosure for said pipe strap to prevent lateral dislodgement thereof from said pipe stabilizing element,
    said arcuate pipe capping surface of said pipe stabilizing element being formed with a relative large radius of curvature to accommodate relatively large pipe sizes but wherein the arc of said radius of curvature is relatively small to accommodate relatively small pipe sizes,
    said first pipe strap guide channel being formed to permit said pipe strap to be threaded therethrough from the top side of said pipe stabilizing element to said pipe capping surface, and having upper cradling surfaces for cradling the enlarged base end of said pipe strap in said first guide channel so as to removably hold same, and said second pipe strap guide channel being formed to permit the tail end of said pipe strap to be threaded therethrough when said pipe strap is wrapped around a pipe braced upwardly against the pipe capping surface of said pipe stabilizing element,
    each of said first and second pipe strap guide channels further including an outer guidewall having a bottom edge recessed in relation to the radius of curvature of said pipe capping surface whereby, when a relatively large pipe is braced thereagainst, said pipe strap will freely pass over said recessed bottom edge of said outer guidewall between said recessed edge and said pipe, and
    means for adjustably securing the tail end of said pipe strap to said pipe stabilizing element whereby said pipe strap tail end can be pulled through said second pipe strap receiving channel to wrap pipes or pipe fittings of different diameters.

7. The pipe hanger of claim 6 wherein said means for adjustably securing the tail end of said pipe strap includes a retaining pin projecting from said pipe stabilizing element adjacent said second guide channel and a series of holes positioned along the length of said pipe strap whereby when any one of a number of standard sized pipes or pipe fittings are braced against said pipe capping surface and said strap wrapped around it, one of said series of strap holes will align with said strap retaining pin.

8. The pipe hanger of claim 7 wherein said pipe strap is secured by said retaining pin whereby said pipe is secured thereby tightly enough for the pipe capping surface of said pipe stabilizing element to cap the pipe but loosely enough to permit axial slippage of the pipe in the pipe hanger.

9. A pipe hanger comprising
    a hanger rod,
    a flexible and threadable unitary pipe strap, said pipe strap having an enlarged base and a tail end,
    a pipe stabilizing element having a top side secured to the bottom of said hanger rod,
    said pipe stabilizing element having an arcuate pipe capping surface on the bottom thereof opposite said hanger rod and further having first and second pipe strap guide channels extending therethrough which provide pipe strap channel bottom openings on laterally opposite sides of said pipe capping surface, said pipe strap guide channels providing a sufficient enclosure for said pipe strap to prevent lateral dislodgement thereof from said pipe stabilizing element,
    said first pipe strap guide channel being formed to permit said pipe strap to be threaded therethrough from the top side of said pipe stabilizing element to said pipe capping surface, and having upper cradling surfaces for cradling the enlarged base end of said pipe strap in said first guide channel so as to removably hold same, and said second pipe strap guide channel being formed to permit the tail end of said pipe strap to be threaded therethrough when said pipe strap is wrapped around a pipe braced upwardly against the pipe capping surface of said pipe stabilizing element,
    said pipe capping surface of said pipe stabilizing element being defined by a radius of curvature and each of said first and second pipe strap guide channels including an outer guide wall having a bottom edge recessed in relation to the radius of curvature of said pipe capping surface whereby, when a relatively large pipe is braced thereagainst, said pipe strap will freely pass over said recessed bottom edge of said outer guide wall between said recessed edge and said pipe, and
    means for adjustably and releasably securing the tail end of said pipe strap whereby said pipe strap tail end can be pulled through said second pipe strap channel and secured to wrap pipes or pipe fittings of different diameters.

* * * * *